United States Patent [19]

Herberman et al.

[11] Patent Number: 5,284,366
[45] Date of Patent: Feb. 8, 1994

[54] QUICK-CONNECT RECEIVER

[75] Inventors: Alfred F. Herberman, Ann Arbor; Edward C. Larsen, Ypsilanti, both of Mich.

[73] Assignee: Syron Engineering & Manufacturing Corporation, Saline, Mich.

[21] Appl. No.: 758,048

[22] Filed: Sep. 12, 1991

[51] Int. Cl.$^5$ .............................................. F16L 35/00
[52] U.S. Cl. ...................................... 285/26; 285/84; 285/178; 285/330
[58] Field of Search .................. 285/24, 26, 27, 29, 285/65, 68, 69, 70, 84, 325, 326, 327, 330, 310, 312, 178, 358, 394; 403/340, 341, 378, 379, 409.1

[56] References Cited

U.S. PATENT DOCUMENTS

| 113,869 | 4/1871 | Gaylord | 285/330 |
| 408,116 | 7/1884 | Leland | 285/72 |
| 410,552 | 9/1889 | Kennedy | 285/72 |
| 2,490,316 | 12/1949 | Ostrak | 285/330 X |
| 4,898,287 | 2/1990 | Blatt | 285/312 X |

FOREIGN PATENT DOCUMENTS

| 378210 | 1/1940 | Italy | 403/341 |
| 410311 | 4/1945 | Italy | 403/341 |
| 54546 | 1/1911 | Switzerland | 403/341 |
| 537223 | 11/1976 | U.S.S.R. | 285/178 |

Primary Examiner—Dave W. Arola
Attorney, Agent, or Firm—Howard & Howard

[57] ABSTRACT

A unique quick-connect receiver is disclosed for connecting an adapter to the receiver. A lock pin within the receiver is moved eccentrically to force the adapter further into the receiver, and lock the adapter. The adapter and receiver have mating Z-shaped surfaces which are forced to ride along each other as the adapter is moved to be locked within the receiver. The combination results in a high strength connection that may be quickly connected and disconnected.

30 Claims, 3 Drawing Sheets

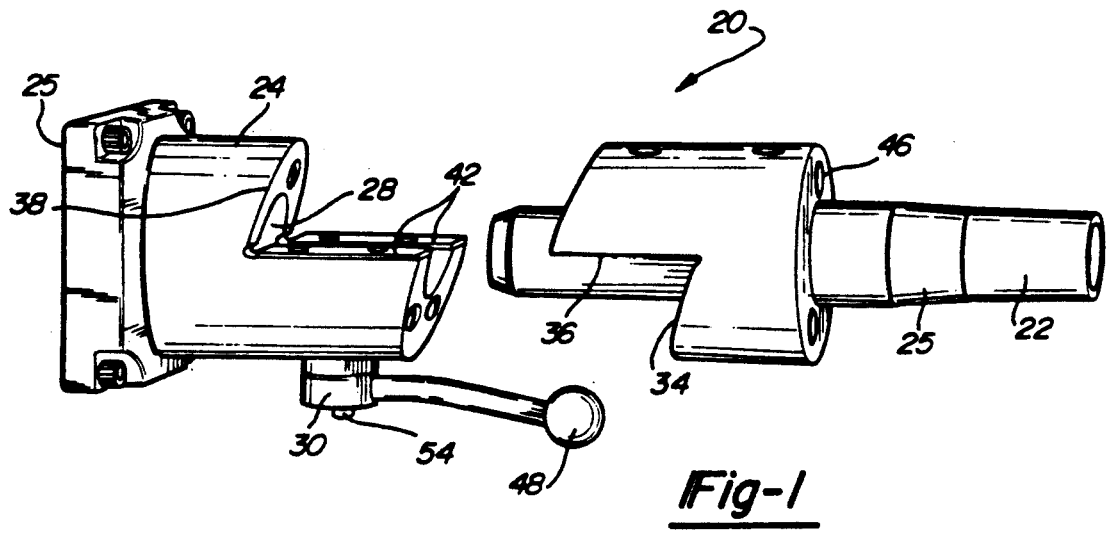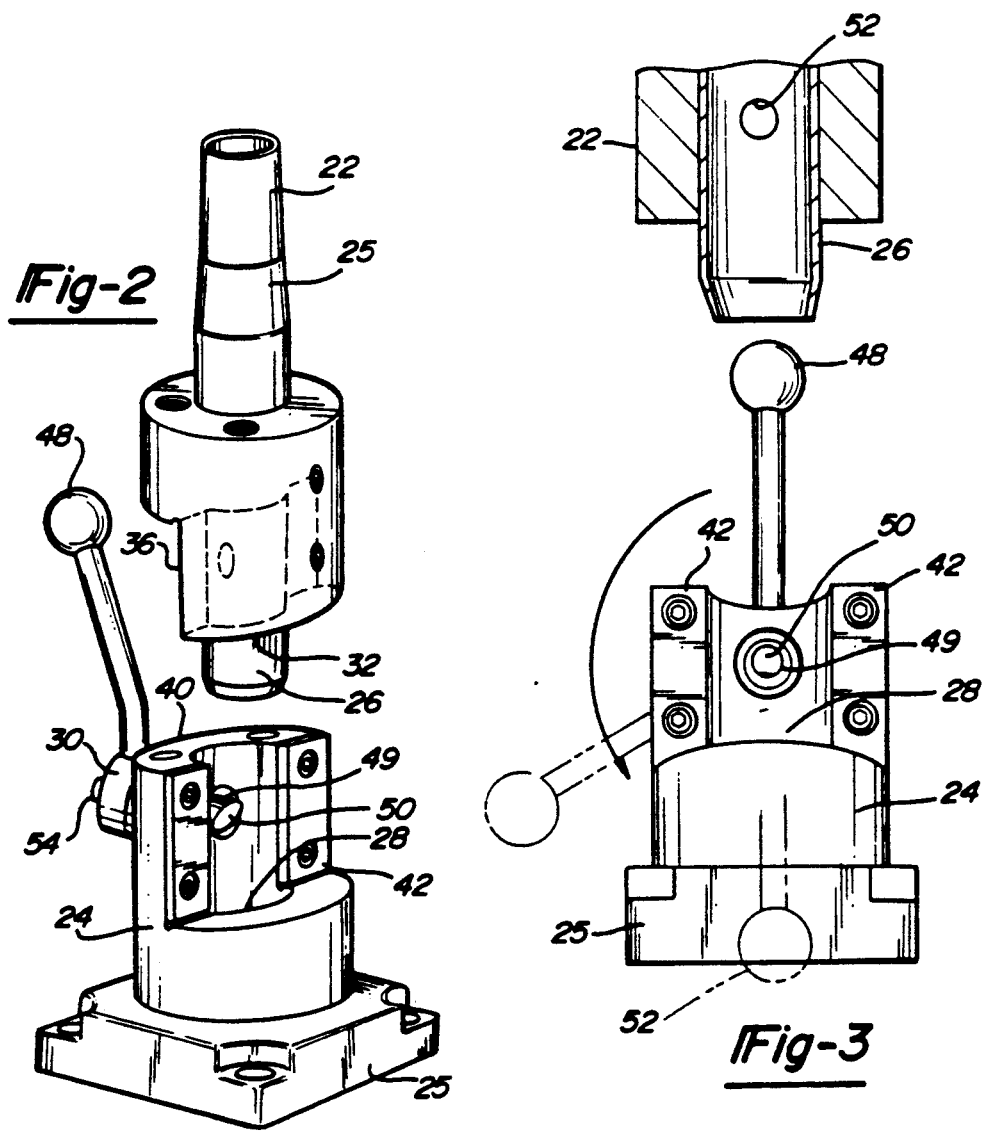

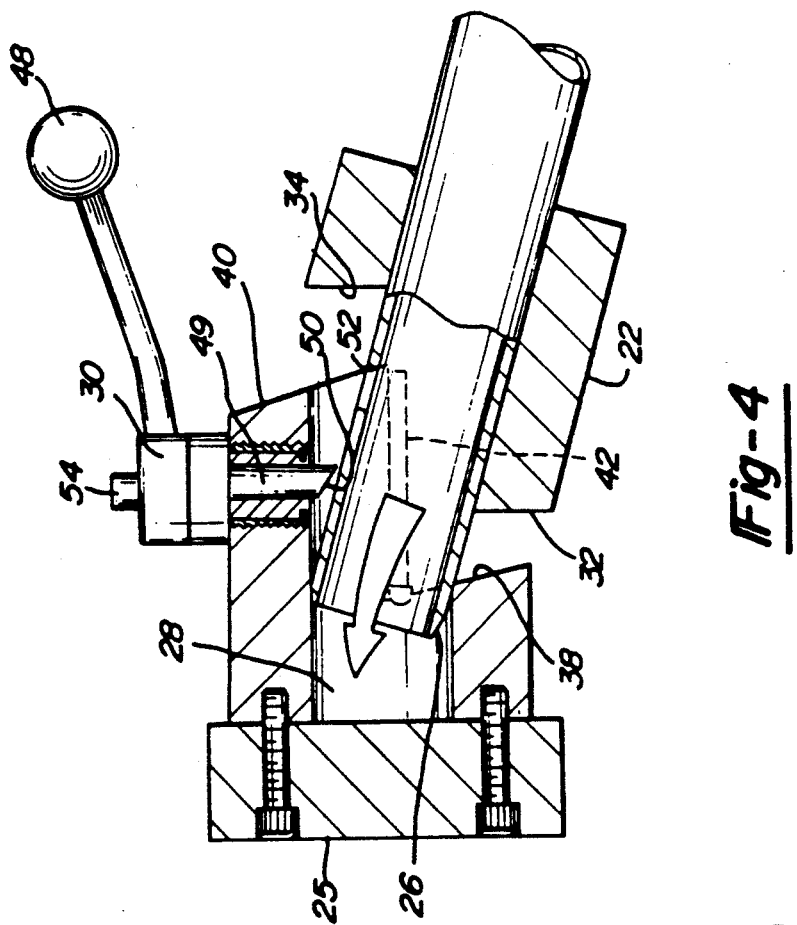
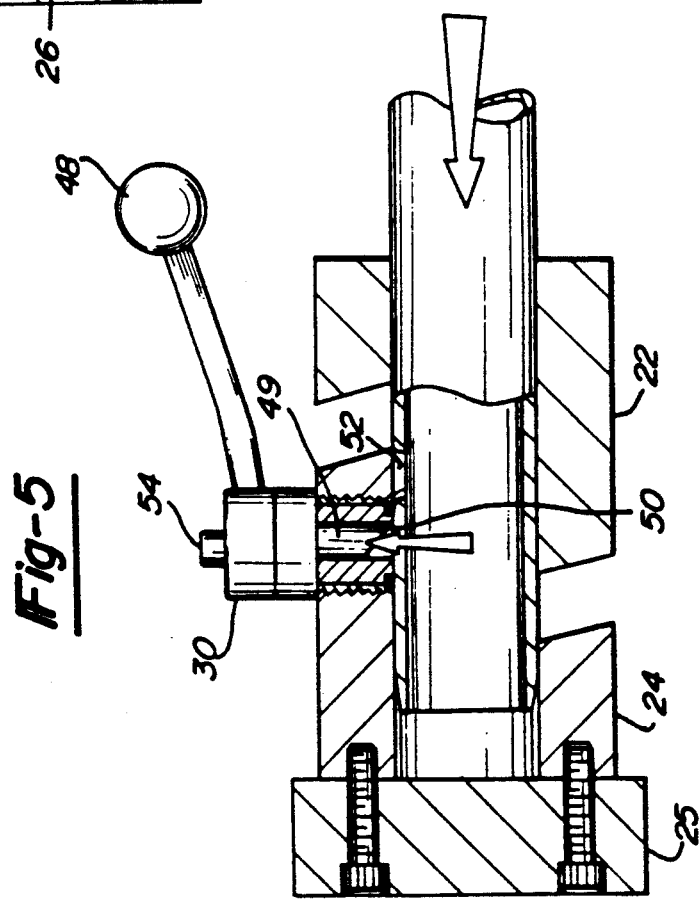

QUICK-CONNECT RECEIVER

BACKGROUND OF THE INVENTION

This application relates to a receiver which quickly and easily secures a work-performing member within a mount space.

Prior art receivers are known in which a work-performing member may be quickly connected to support structure. These receivers are used in industrial environments to connect various members, such as robot arms or other work transfer devices to the receiver. The work-performing members connected to the receiver will be referred to as "end effectors" for the purposes of this application. In general, there has been a problem achieve a strong secure connection with known quick-connect receivers.

Prior art receivers are known which provide a strong connection. Unfortunately, these receivers have typically not allowed an operator to quickly connect or disconnect an end effector.

The prior art has addressed the goal of achieving both quick and strong connections by developing complex structures. These structures make it more difficult to actually secure the end effector within the receiver, and may result in the end effector not being properly received within the receiver when the receiver is loaded to lock the end effector.

It is desirable to quickly disconnect or connect an end effector to a receiver. It is also desirable that the receiver securely mount the end effector, and further, it is important that it be relatively easy to ensure that the end effector is properly received in the receiver. Prior art connectors have proven somewhat deficient in achieving all of these goals.

SUMMARY OF THE INVENTION

The present invention discloses a quick-connect receiver for securely and rapidly mounting an adapter within a mount space. The adapter is preferably connected to an end effector such as an arm or gripper. The adapter may be quickly mounted or removed from the receiver, but a strong connection is still provided. Further, the end effector must be properly positioned within the receiver, or a lock cannot be loaded.

In a disclosed embodiment, a lock pin extends from the receiver into a hole in the adapter. The lock pin rotates eccentrically from a release position where its center is positioned outwardly of the mount space in the receiver, to a lock position where its center is positioned further into the mount space. As the lock pin moves to the lock position, it forces the adapter further into the mount space, firmly securing the adapter within the receiver. The lock pin must be positively received in the hole before the adapter will move the adapter to lock. This ensures that the adapter is properly received in the receiver prior to loading.

In a disclosed embodiment, the adapter has two angled planar surfaces with a flat planar surface interconnecting the two. The combination of two angled planar surfaces, with a connecting flat planar surface, could be described as forming a Z-shape. The receiver has a similar Z-shaped structure, which corresponds to and mates with the adapter Z-shaped structure. As the lock pin forces the adapter further into the mount space, the angled planar surfaces on the adapter are forced into, and along, the angled planar surfaces on the receiver. The angled planar surfaces are pinched inwardly, with the flat planar surfaces being forced into each other. The adapter is thus firmly secured to the receiver.

In a preferred embodiment the lock pin has an inclined face which facilitates removal of the adapter. When in a release position the inclined face looks rearwardly into the mount space. The lock pin is spring-biased downwardly into the hole in the adapter. When it is desired to remove the adapter, one merely moves the lock pin to the release position and pulls the adapter outwardly of the mount space. The hole in the adapter cams the inclined face of the lock pin upwardly into a lock arm structure, allowing the adapter to be removed from the receiver.

In other features of the present invention, air passages extend from the receiver into mating air passages in the adapter to supply air to an end effector. The air passages are incorporated into the angled planar surfaces, which surrounds and protects the air passages. Since the adapter angled planar surfaces are forced onto the receiver angled planar surfaces when locked, the air passages in the respective planar surfaces are forced into sealing engagement.

These and other objects of the present invention will best be understood from the following specifications and drawings, of which is the following is a brief description.

BRIEF DESCRIPTION OF THE DRAWINGS

FIG. 1 is a perspective view of a quick-connect assembly according to the present invention.

FIG. 2 is another perspective of the assembly illustrated in FIG. 1.

FIG. 3 is a partially cross-sectional plan view of the assembly illustrated in FIG. 1.

FIG. 4 is a partially cross-sectional side view showing the insertion of an adapter into a receiver according to the present invention.

FIG. 5 is a view of a subsequent step in the mounting of the adapter shown in FIG. 4.

DETAILED DESCRIPTION OF A PREFERRED EMBODIMENT

Figure 6:
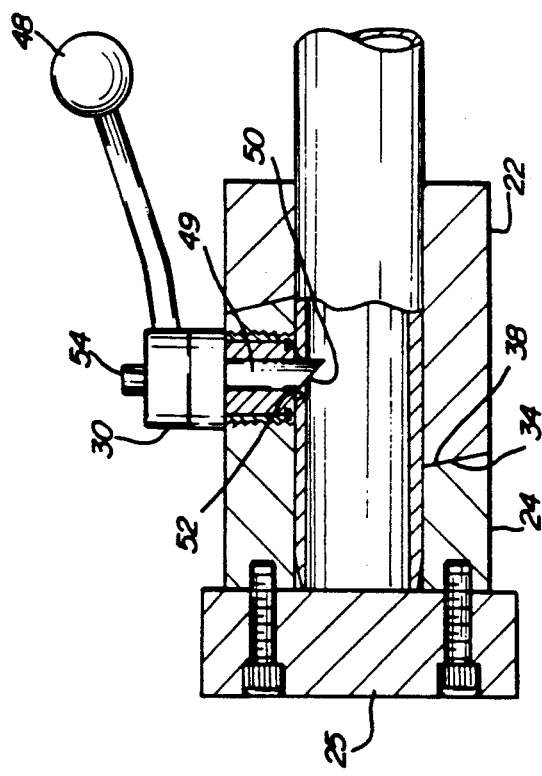
FIG. 6 is a view of another subsequent step in the mounting of the adapter into the receiver.

FIG. 1 shows quick-connect structure 20 for securing adapter 22 within receiver 24. Adapter 22 may be connected to any type of end effector structure, and has a hollow tube portion 25, and solid outer mount portion 27. Tube portion 25 has stepped-down end 29, which includes a plurality of progressively smaller tube outer diameters to receive different end effector inner diameters. This facilities the use of adapter 22 with a number of different end effectors. An inner tube end 26 is to be received within mount space 28 in receiver 24. Lock mechanism 30 locks adapter 22 within mount space 28.

Mount portion 27 has first angled planar surface 32 positioned on one vertical side of tube 25, and second angled planar surface 34 positioned on the other vertical side of tube 25. Planar surfaces 32 and 34 are parallel. Flat or axial planar surface 36 extends generally parallel to an axis of adapter 22 and connects planes 32 and 34.

Receiver 24 has similar structure including angled planar surfaces 38 and 40 and axial planar surface 42. The receiver axial planar surfaces 42 include wear plates. The combination of planes 32, 34 and 36 and planes 38, 40 and 42 each define generally Z-shaped structure.

Air passages 44 are formed in angled planar surfaces 38 and 40, and mating, non-illustrated, passages are formed in angled planar surfaces 32 and 34. Air passages 46 are shown at the opposed end of adapter 22, which is adapted to be connected to an end-effector. Mount plate 25 preferably has air passages for connection to a source of pressurized air.

One end effector which may be used with this invention may be a shovel-type parts lifter which utilizes air delivered through air passage 46 to power a piston and lift a part. It should be understood that any type of end effector would come within the scope of this invention, however, and could be attached to adapter 22.

FIG. 2 is another perspective view of connector 20. Adapter 22 has hole 52 formed on a side of tube end 26 positioned adjacent angled planar surface 34.

Receiver 24 has lock pin 49 extending into mount space 28, and having an inclined face 50. Lock mechanism 30 is in a position where handle 48 extends axially towards adapter 22, and inclined face 50 facing rearwardly. This is the release position. Handle 48 is rotatable, and lock pin 49 rotates with handle 48 to lock adapter 22 within receiver 24, as will be explained below.

As can be appreciated from FIG. 3, as adapter 22 is moved into receiver 24, tube end 26 is initially received within space 28. Lock pin 49 is in the release position with inclined face 50 positioned as shown in FIG. 2. Hole 52 will receive lock pin 49.

Lock pin 49 is eccentrically received within cylindrical washer 51. As handle 48 rotates between the release position, and a lock position 53, shown in phantom, washer 51 also rotates. Lock pin 49 rotates eccentrically with washer 51. In the release position, lock pin 49 is centered on axis A. In the lock position, lock pin 49 is centered on axis B. Axis A is positioned forwardly of axis B by a small distance. Lock pin 49 is received in hole 52 when handle 48 is moved to lock position 53, and forces adapter 22 into space 28 as it moves to the lock position.

FIG. 4 shows a first step in mounting adapter 22 within receiver 24. Tube end 26 is angled into mount space 28. Angled planar surface 34 is further removed from tube end 26 than angled planar surface 32. This creates a clearance space 55 above end 26, adjacent plane 34, which facilities this angled entry of adapter 22 into space 28. Lock pin 49 is in the release position with inclined face 50 facing axially rearwardly into mount space 28.

Lock pin 49 is normally biased outwardly of lock mechanism 30, but is selectively forced upwardly as shown in FIG. 5. As adapter 22 moves into mount space 28 an outer surface 56 on tube end 26 biases lock pin 49 upwardly into lock mechanism 30. Adapter 22 is then moved further into mount space 28. The structure for biasing lock pin 49 may be of any known type.

As shown in FIG. 6, once lock pin 49 becomes aligned with hole 52, it is again biased downwardly, and into hole 52. This fixes adapter 22 axially within receiver 24. In this position, lock pin 49 is centered on axis A. Angled planar surfaces 32 and 38, and angled planar surfaces 34 and 40 mate. Although not illustrated in this figure, axial planar surfaces 36 and 42 would also mate.

Figure 7:
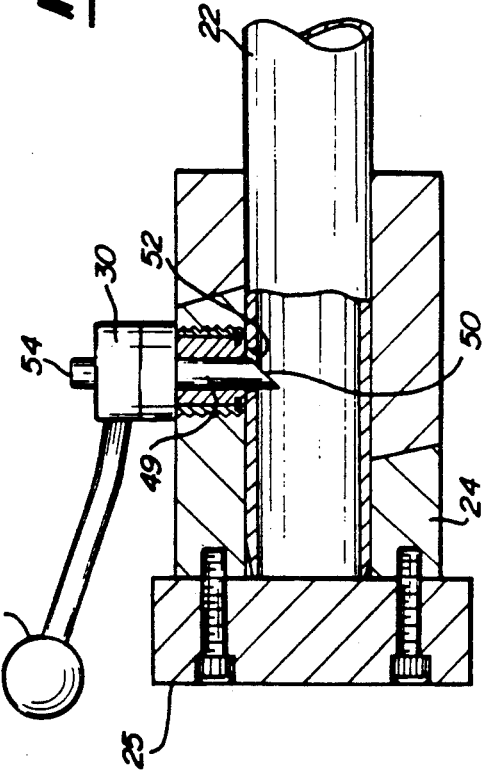
FIG. 7 is a view showing a finally secured adapter and receiver.

FIG. 7 illustrates the locking of adapter 22 within receiver 24. Handle 48 is rotated and moved approximately 180° to lock position 53. Lock button 54 must be depressed to allow lock mechanism 30 to be rotated between the lock and release positions. Preferably, handle 48 may only rotate in one direction between these positions. The structure for locking lock mechanism 30 until released by lock button 54 may be of any known type.

In the position illustrated in FIG. 7, lock pin 49 is centered on axis B, which is moved further into space 28 from axis A. As lock pin 49 moves to this position, it forces hole 52 and adapter 22 further into space 28. As adapter 22 is forced further into space 28 angled planar surfaces 32 and 38 and surfaces 34 and 40 are forced into each other. Angled planar surface 34 rides on angled planar surface 40 and forces it radially inwardly, while angled planar surface 38 forces angled planar surface 34 radially inwardly. The radial constriction forces axial planar surfaces 36 and 42 into each other.

The combination of the eccentric movement of lock pin 49, and the Z-shaped structure of adapter 22 and receiver 24 ensure a strong connection. Also, due to the unique structure, the mounting of adapter 22 to receiver 24 is relatively quick and non-complex. Since lock pin 49 cannot force adapter 22 into space 28 unless it is properly received within hole 52, adapter 22 must be properly positioned within receiver 24 prior to loading.

Figure 9:
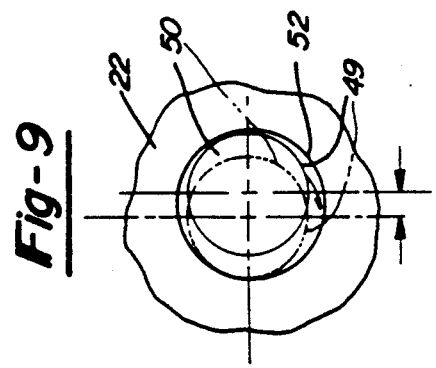
FIG. 9 is a view of the movement of a lock pin between release and lock positions.

FIG. 9 shows the movement of lock pin 49 between the release and lock positions. Lock pin 49 has a smaller diameter than hole 52. In the release position lock pin 49 is centered on axis A. When in the lock position lock pin 49 is centered on axis B, which is removed rearwardly into mount space 28 from axis A by a distance D.

The difference in diameters between lock pin 49 and hole 52, and the inclined face 50 of lock pin 49, allow the eccentric movement within hole 52 between the release and lock positions. As lock pin 49 moves from the release position to the lock position, an edge of inclined face 50 begins to contact and cam the inner periphery of hole 52 further into mount space 28. As explained above, once lock pin 49 reaches the lock position where it is centered at axis B, adapter 22 is securely locked within receiver 24.

Figure 8:
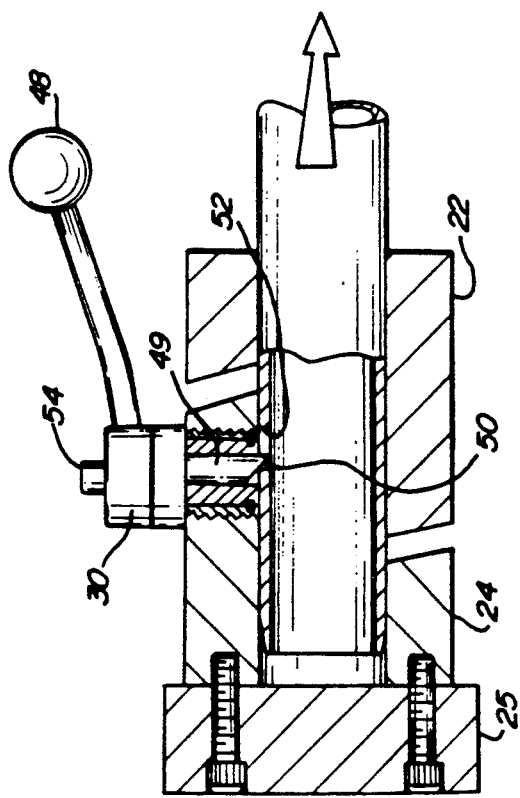
FIG. 8 is a view showing the removal of the adapter f rom the receiver.

As shown in FIG. 8, when it is desired to removed adapter 22 from receiver 24, one first depresses lock button 54 and moves handle 48 to the release position. Inclined face 50 again faces rearwardly into space 28. Hole 52 has edge 58 which rides along face 50, and cams lock pin 49 upwardly into lock mechanism 30. Surface 56 then maintains lock pin 49 upwardly and removed from space 28. Adapter 22 may thus be easily removed from receiver 24.

The angled planar surfaces are preferably formed of hardened aluminum. The air passages are formed of steel, and may have exchangeable check valves received in them. In particular passages 44 may include such check valves. An internal electric plug connector may be positioned within mount 35 such that electrical connections can extend through tube 25, and to end 29 of adapter 22. Tube 25 is preferably formed of hardened steel.

A preferred embodiment of the present invention has been disclosed, however, a worker of ordinary skill in the art would recognize that certain modifications would come within the scope of this invention. For that reason, the following claims should be studied in order to determine the true scope and content of this invention.

We claim:

1. A connector for securing a work member comprising:
   a receiver comprising a lock mechanism means, a mount surface and defining a mount space;
   a work member having a first end, said first end having a central part and a hole formed therein, said first end selectively positioned within said mount space such that said mount surface at least partially supports said work member, said lock mechanism means securing said work member within said receiver, said lock mechanism means including a lock pin received in said hole formed in said first end central part, and said lock pin engaging a surface of said first end defining said hole;
   said lock pin selectively transmitting a force from said receiver to said work member in a direction into said mount space; and means biasing
   said lock pin downwardly into said hole, and allowing said lock pin to be selectively forced upwardly out of said hole.

2. A connector as recited in claim 1, wherein said work member consists of a central part including said first end, and a first angled planar surface spaced on one side of said central part, said central part extending generally along an axis, said first angled planar surface defining a plane non-perpendicular to said axis, said force moving said central part along said axis, said receiver mount surface including a first angled planar surface which is generally parallel to and supports said first angled planar surface of said work member, such that when said force is applied to said work member, said first angled planar surface of said work member is forced into first said angled planar surface of said receiver.

3. A connector as recited in claim 2, wherein there are second angled planar surfaces on both said work member and said receiver, said second angled planar surfaces being spaced from said central part on an opposed side from said first angled planar surface.

4. A connector as recited in claim 3, wherein a third planar surface extends generally parallel to said axis, and interconnects said first and second angled planar surfaces on said work member and said receiver, said third plane being positioned radially outwardly of said central part.

5. A connector as recited in claim 3, wherein said first and second planes on said work member are generally parallel, and said first and second planes on said receiver are generally parallel.

6. A connector as recited in claim 5, wherein a third planar surface extends generally parallel to said axis, and interconnects said first and second angled planar surfaces on said work member and said receiver, said third plane being positioned radially outwardly of said central part.

7. A connector as recited in claim 3, wherein said first angled planar surface of said work member extends axially to a first position and said second angled planar surface of said work member extends axially to a second axial position, said second axial position being positioned closer to said first end than said first axial position such that a clearance space is defined above said central part in the area of said first angled planar surface.

8. A connector as recited in claim 7, wherein said lock pin is eccentrically rotatable within said hole to move between a lock position and a release position, such that said lock pin is positioned further into said mount space when in said lock position then in said release position, the movement of said lock pin between said lock and release positions causing said lock pin to force said work member further into said mount space.

9. A connector as recited in claim 8, wherein said lock pin has a first outer diameter, and said hole has a second inner diameter, said second inner diameter being greater than said first outer diameter such that there is clearance for the eccentric rotation of said lock pin within said hole.

10. A connector as recited in claim 1, wherein said lock pin has an inclined face which faces into said mount space when said lock mechanism is in said release position, and faces outwardly of said mount space when said lock mechanism is moved to said lock position.

11. A connector as recited in claim 10, wherein said lock pin has a first outer diameter, and said hole has a second inner diameter, said second inner diameter being greater than said first outer diameter such that there is clearance for the eccentric rotation of said lock pin within said hole.

12. A connector as recited in claim 10, wherein said lock mechanism may only turn in one rotational direction.

13. A connector as recited in claim 12, wherein a release pin must be depressed to allow said lock mechanism to rotate.

14. A connector as recited in claim 1, wherein said work member is an adapter which may be connected to any one of a number of end effectors.

15. A connector as recited in claim 1, wherein said lock pin has an inclined face received within said hole to provide a ramp facilitating biasing of said lock pin outwardly of said hole.

16. A connector as recited in claim 15, wherein said lock pin rotates eccentrically within said hole between a lock and release position.

17. A connector as recited in claim 16, wherein said lock pin has an outer diameter that is smaller than the inner diameter of said hole.

18. A connector as recited in claim 1, wherein said lock pin rotates eccentrically within said hole between a lock and release position.

19. A connector as recited in claim 18, wherein said lock pin has an outer diameter that is smaller than the inner diameter of said hole.

20. A connector for connecting a work member to a receiver comprising:
   a receiver comprising a lock mechanism, a mount surface and defining a mount space, said lock mechanism having a lock pin extending into said mount space, said lock mechanism being rotatable between lock and release positions, said lock pin rotating eccentrically relative to the axis of rotation of the remainder of said lock mechanism, such that said lock pin is centered on a first axis positioned outwardly of said mount space in said release position, and is centered on a second axis positioned further inwardly of said mount space when in said lock position;
   a work member selectively positioned within said mount space such that said receiver at least partially supports said work member on said mount surface, said lock mechanism selectively securing said work member within said receiver, said work member having a central part extending along an axis into said mount space, said work member having a first angled planar surface spaced to one side of said central part, said first angled planar surface defining a plane which is non-perpendicular to said axis, said work member having a second angled planar surface spaced from said central part on an opposed side from said first angled planar surface;

said central part including a hollow member positioned radially between said first and second angled planar surfaces and adapted to be received in said mount space;

said mount surface on said receiver including first and second angled planar surfaces which support said first and second angled planar surfaces of said work member, a central bore of said mount space being defined between said first and second angled planar surface, said hollow member being received in said central bore; and said lock pin being received in a hole in said central part, said hole moving with said lock pin between said lock position where it secures said work member to said receiver and to said release position, and said work member moving with said hole, forcing said first and second planar angled surfaces of said work member into said first and second angled planar surfaces of said receiver, at least some of said planar surface being forced radially inwardly, providing a secure connection of said hollow member and said work member.

21. A connector as recited in claim 20, wherein said lock pin has an inclined face and an outer diameter smaller than the inner diameter of said hole.

22. A connector as recited in claim 20, wherein said work member is an adapter to be selectively connected to any of a number of end effectors.

23. A connector as recited in claim 20, wherein said first and second angled planar surfaces on said work member are generally parallel, and said first and second angled planar surfaces on said receiver are generally parallel.

24. A connector as recited in claim 23, wherein third planar surfaces are formed on both said receiver and said work member, extending generally parallel to said axis, and interconnecting said first and second angled planar surfaces on each of said work member and said receiver, said third planar surfaces being positioned radially outwardly of said central part.

25. A connector as recited in claim 20, wherein third planar surfaces are formed on both said receiver and said work member, extending generally parallel to said axis, and interconnecting said first and second angled planar surface on each of said work member and said receiver, said third planar surfaces being positioned radially outwardly of said central part.

26. A connector for connecting a work member to a receiver comprising:

a receiver having a mount surface for supporting a work member, and defining a mount space at a generally central location for receiving an end of said work member, said mount surface of said receiver including first and second angled planar surfaces which are non-perpendicular to a central axis of said receiver, said first and second angled planar surfaces being spaced on opposed side of said central axis of said receiver, a central bore defined between said first and second angled planar surfaces;

a work member having a central part extending axially into said mount space to be secure within said receiver, said work member further having first and second angled planar surfaces supported on said first and second angled planar surfaces of said receiver, said central part including a hollow member positioned radially between said first and second angled planar surfaces and adapted to be received in said central bore;

means to force said work member axially further into said mount space, such that said first and second angled planar surfaces of said work member are forced into said first and second angled planar surfaces of said receiver, forcing at least some of said planar surfaces radially inwardly, providing a secure connection of said hollow member of said work member within said bore of said receiver.

27. A connector as recited in claim 26, wherein said work member is an adapter to be connected to any of a number o fend effectors.

28. A connector as recited in claim 26, wherein air passages are formed within said receiver, and mating air passages are formed within said work member, said mating air passages being connected to said air passages within said receiver when said work member is locked within said receiver, and serving to supply air to an end of said work member positioned outwardly of said mount space.

29. A connector as recited in claim 28, wherein said air passages are formed in at least one of said angled planar surfaces in both said receiver and said work member, said air passages being forced into sealing engagement as said first and second angled planar surfaces are forced into each other.

30. A connector as recited in claim 26, wherein third planar surfaces are formed on both said receiver and said work member, extending generally parallel to said axis, and interconnecting said first and second angled planar surface on each of said work member and said receiver, said third planar surfaces being positioned radially outwardly of said central part.

* * * * *